(12) United States Patent
Schwesig

(10) Patent No.: US 7,737,652 B2
(45) Date of Patent: Jun. 15, 2010

(54) METHOD AND APPARATUS FOR SAFE TORQUE LIMITING

(75) Inventor: Günter Schwesig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 346 days.

(21) Appl. No.: 11/851,768

(22) Filed: Sep. 7, 2007

(65) Prior Publication Data

US 2008/0061721 A1    Mar. 13, 2008

(30) Foreign Application Priority Data

Sep. 7, 2006    (DE) .................. 10 2006 042 038

(51) Int. Cl.
*H02P 7/00* (2006.01)

(52) U.S. Cl. .................. 318/432; 318/400.02

(58) Field of Classification Search .......... 318/432, 318/434, 727, 798, 807, 400.02, 400.06, 318/400.15, 400.37

See application file for complete search history.

(56) References Cited

U.S. PATENT DOCUMENTS

| | | | | |
|---|---|---|---|---|
| 4,593,240 | A * | 6/1986 | Blaschke | 318/800 |
| 5,550,450 | A * | 8/1996 | Palko et al. | 318/800 |
| 5,565,752 | A * | 10/1996 | Jansen et al. | 318/807 |
| 6,426,602 | B1 * | 7/2002 | McCann et al. | 318/432 |
| 2003/0015987 | A1 * | 1/2003 | Cheong et al. | 318/701 |

FOREIGN PATENT DOCUMENTS

| | | |
|---|---|---|
| DE | 198 07 688 A1 | 1/1997 |
| DE | 100 59 172 A1 | 6/2002 |
| DE | 101 63 010 A1 | 11/2002 |
| EP | 1 248 342 A1 | 10/2002 |

OTHER PUBLICATIONS

"Saftey in Bewegung—Sicherheitsfunktionen für Antriebssteuerungen in der Praxis". abgedruckt in der DE-Zeitschrift "elektrotechnik", Heft 9, 2003, p. 34-36.

* cited by examiner

*Primary Examiner*—Rina I Duda
(74) *Attorney, Agent, or Firm*—Henry M. Feiereisen; Ursula B. Day

(57) ABSTRACT

A method for safely limiting the torque of a frequency-converter-fed three-phase motor operated under field-oriented control (controlled torque) is disclosed. Actual phase current values of the three-phase motor are used to calculate a sum current signal on two channels which is checked for a sum current value of zero. A rotor position angle is determined on the two channels, and torque-forming current components of the two orthogonal field-oriented current components of a stator current space vector are calculated on the two channels as a function of the measured phase currents and the rotor position angle. The three-phase motor is switched on the two channels without applying a torque if the sum value is not equal to zero and/or if the torque-forming current components calculated on the two channels are not equal. This produces a safety function "safe torque limiting" which can be integrated in commercially available frequency converters.

20 Claims, 5 Drawing Sheets

METHOD AND APPARATUS FOR SAFE TORQUE LIMITING

CROSS-REFERENCES TO RELATED APPLICATIONS

This application claims the priority of German Patent Application, Serial No. 10 2006 042 038.1, filed Sep. 7, 2006, pursuant to 35 U.S.C. 119(a)-(d), the content of which is incorporated herein by reference in its entirety as if fully set forth herein.

BACKGROUND OF THE INVENTION

The present invention relates to a method for safe torque limiting of a frequency-converter-fed three-phase motor which is operated on a field-oriented basis, and to an apparatus for carrying out this method.

Nothing in the following discussion of the state of the art is to be construed as an admission of prior art.

When using electrical drives for industrial automation, for example, for numerically controlled machine tools and robots, one aim is to protect man and machine to the greatest extent possible. Many machine drives lead to movements that result in danger, and which people must be protected against. While until now, drive controllers have been disconnected from the power supply system when manual actions for fault rectification, for setting up, etc. were necessary, nowadays applications exist in which this is undesirable or impossible. Furthermore, actions often have to be carried out with the machine running so that operation is necessary with the protective effect of protective devices cancelled. Safety functions such as safe stopping, safely reduced speed and safe shutdown have been defined for this purpose, some of which can be implemented using conventional frequency converters, or are integrated in frequency converters.

The implementations of safe protective measures are described in the publication entitled "Safety in Bewegung—Sicherheitsfunktionen für Antriebssteuerungen in der Praxis", ["*Safety in movement—safety functions for drive control systems in practice*"], printed in the German journal "elektrotechnik" ["*Electrical Engineering*"], Issue 9, 2003, pages 34 to 36. These safe protective measures in this publication include safe pulse inhibiting (safe stopping) and safe movement control. Integration of safety in the functional machine control system results in two-channel computer structures. A drive is likewise switched off on two channels by means of the "safe pulse inhibit". The two computers for the two-channel computer structure therefore each have an independent switching-off path. In order to allow faults in the control system to be identified, the two computers in the two-channel computer structure carry out not only self-tests but also, inter alia, crosswise data comparison, by comparing safety-relevant data items with one another.

The expression "safe" is in this case intended to express the fact that the respective requirements are satisfied for the purposes of the Berufsgenossenschaft und berufsgenossenschaftlichen Institute für Arbeitssicherheit [*German Professional Society and Professional Institute for Safety at the Workplace*].

Presently, these functions do not eliminate all hazard situations. This will be explained in more detail using an example:

A machine component comprises driven rollers. An item is fed over or processed via these rollers. The operator must reach into the machine component for maintenance purposes, for repair, for cleaning or for removing an item that has become jammed. However, the rollers must be moved for this process. To do this, the rollers are operated at a safe reduced speed, for example, in accordance with DE 101 63 010 A1 or DE 100 59 172 A1 (without sensors). It is still a potential hazard, however, despite the reduced speed. If, for example, a finger is introduced between the rollers, then it will be injured and it is no longer possible to remove it in the case of danger from the machine component causing the danger.

For safely eliminating this potential danger, safe torque limiting must be used in addition to safe speed limiting. The torque is limited in such a way that, if a finger is introduced between the rollers, the torque produced by the rollers does not exceed a level that may cause injury, and the opposing torque from the finger brings the rollers to rest.

At the moment, sliding clutches, weak points or torque sensors are used for torque limiting. The use of these elements allows the three-phase motor to be stopped, with a correspondingly long shutdown time.

It would therefore be desirable and advantageous to safely carry out torque limiting and to integrate this in the functional machine control system.

SUMMARY OF THE INVENTION

According to one aspect of the invention, a method for safely limiting a torque of a frequency-converter-fed three-phase motor operated under field-oriented control includes the steps of measuring phase currents of the three-phase motor, forming sum current signals from the measured phase currents and checking on two channels that each of the sum current signals has a sum value of zero, determining on two channels a rotor position angle of the three-phase motor, computing on the two channels from the measured phase currents corresponding torque-forming current components as a function of the rotor position angle, monitoring the computed torque-forming current components, determining if the computed torque-forming current components exceed a predetermined current component limit value, crosswise comparing the computed torque-forming current components for equality, and generating a pulse cancellation signal when the computed torque-forming current components exceed a limit value or are not equal.

The torque of a frequency-converter-fed three-phase motor which is operated on a field-oriented basis is governed by the torque-forming current component of the two orthogonal field-oriented current components of a stator current space vector. These components are calculated by means of a two-channel computer structure and are compared with one another by means of crosswise data comparison and, if a predetermined limit value is exceeded, the three-phase motor is switched to zero torque, likewise on two channels by means of a safe pulse inhibit.

The two-channel calculation of the torque-forming current component of a field-oriented stator current space vector is safe for the purposes of the Berufsgenossenschaft und berufsgenossenschaftlichen Institute für Arbeitssicherheit [*German Professional Society and Professional Institute for Safety at the Workplace*] only if an actual stator-current space vector is safely determined and transformed by means of a safely produced rotor position angle to a field-oriented actual stator-current space vector. The rotor position angle is determined on two channels for this purpose. For safe determination of an actual stator-current space vector, the phase currents of the three-phase motor are detected and a sum current signal is formed on two channels in each case and is checked for a sum value of zero.

According to another aspect of the invention, a method for safely limiting a torque of a frequency-converter-fed three-phase motor operated under field-oriented control includes the steps of measuring phase currents of the three-phase motor, forming a sum current signal from the measured phase currents and checking on one channel that the sum current signal has a value of zero, determining a simultaneity normalization error, determining on two channels a rotor position angle of the three-phase motor, computing on the two channels from the measured phase currents corresponding torque-forming current components as a function of the rotor position angle, monitoring the computed torque-forming current components and determining if the computed torque-forming current components exceed a predetermined current component limit value, crosswise comparing the computed torque-forming current components for equality, and generating a pulse cancellation signal when the computed torque-forming current components exceed a limit value or are not equal, or a simultaneity normalization error is detected in the measured phase currents.

This embodiment differs from the first embodiment according to the invention in that a generated sum current signal is checked on one channel for a sum value of zero and a simultaneity normalization error is determined. This embodiment can be implemented at lower cost while still allowing the criteria for safe torque limiting to be satisfied.

These methods according to the invention safely limit the torque of a frequency-converter-fed three-phase motor which is operated on a field-oriented basis.

According to yet another aspect of the invention, an apparatus for safely limiting a torque of a frequency-converter-fed three-phase motor operated under a field-oriented control includes a drive control device with a first microprocessor system for a load-side inverter of the frequency converter, and a second microprocessor system. Each of the microprocessor systems comprises a coordinate transformation device, a sensor signal processing device, a limit monitor, and a pulse cancellation device. In each of the microprocessor systems, an output of the sensor signal processing device and an input of the limit value monitor are connected to the corresponding coordinate transformation device, and an output of the limit monitor is connected to the corresponding pulse cancellation device. The apparatus further includes a current detection device for each of the three motor phases, with each current detection device being connected to a corresponding sensor signal processing device of the first and second microprocessor systems, a position detector device having a two-channel processing device with two outputs, wherein the outputs are connected to corresponding one of the coordinate transformation devices, and a communication device connecting the two microprocessor systems for data transmission therebetween.

According to still another aspect of the invention, an apparatus for safely limiting a torque of a frequency-converter-fed three-phase motor operated under a field-oriented control includes a drive control device with a first microprocessor system for a load-side inverter of the frequency converter, and a second microprocessor system. Each of the microprocessor systems includes a coordinate transformation device, a sensor signal processing device, a limit monitor, and a pulse cancellation device. In each of the microprocessor systems, an input of the limit monitor is connected to the coordinate transformation device and an output of the limit monitor is connected to the pulse cancellation device. The apparatus further includes a current detection device for each of the three motor phases, with the current detection devices being connected to a sensor signal processing device disposed in the first microprocessor system, wherein an output of the sensor signal processing device is connected to the coordinate transformation device of the first microprocessor system. A position detector device having a two-channel processing device with two outputs is provided wherein the outputs are connected to corresponding one of the coordinate transformation devices of the first and second microprocessor systems. The apparatus also includes a communication device connecting the two microprocessor systems for data transmission therebetween, and a device for detecting a simultaneity normalization error.

The second apparatus has a device for detecting a simultaneity normalization error if, for cost reasons, only one sensor signal processing device is to be used, or if only one sensor processing device is available in an existing drive system.

As a result, the second apparatus is less expensive than the first apparatus, without violating the criteria for safe torque limiting.

The simultaneity normalization error may be determined by applying a test signal, processing the test signal and comparing the processed test signal with a true value, and generating the pulse cancellation signal if the processed test signal is not equal to the true value. The simultaneity normalization error may also be determined by processing a measured phase current on two channels, comparing signals obtained in the two channels with one another, and generating the pulse cancellation signal if the signals in the two channels are not equal.

The rotor position angle may be determined by forming a rotor position angle signal from transmitter signals received on each of the two channels.

Each coordinate transformation device may have a coordinate converter and a vector rotator, which are electrically connected in series. Each current detection device may be provided with a normalization factor. Each limit monitor may include a comparator, wherein a predetermined limit value is applied to a non-inverting input of the comparator.

The load-side inverter may be a self-commutating pulse-controlled inverter. The communication device may include a bus system.

The first and second microprocessor systems may form a part of a frequency converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
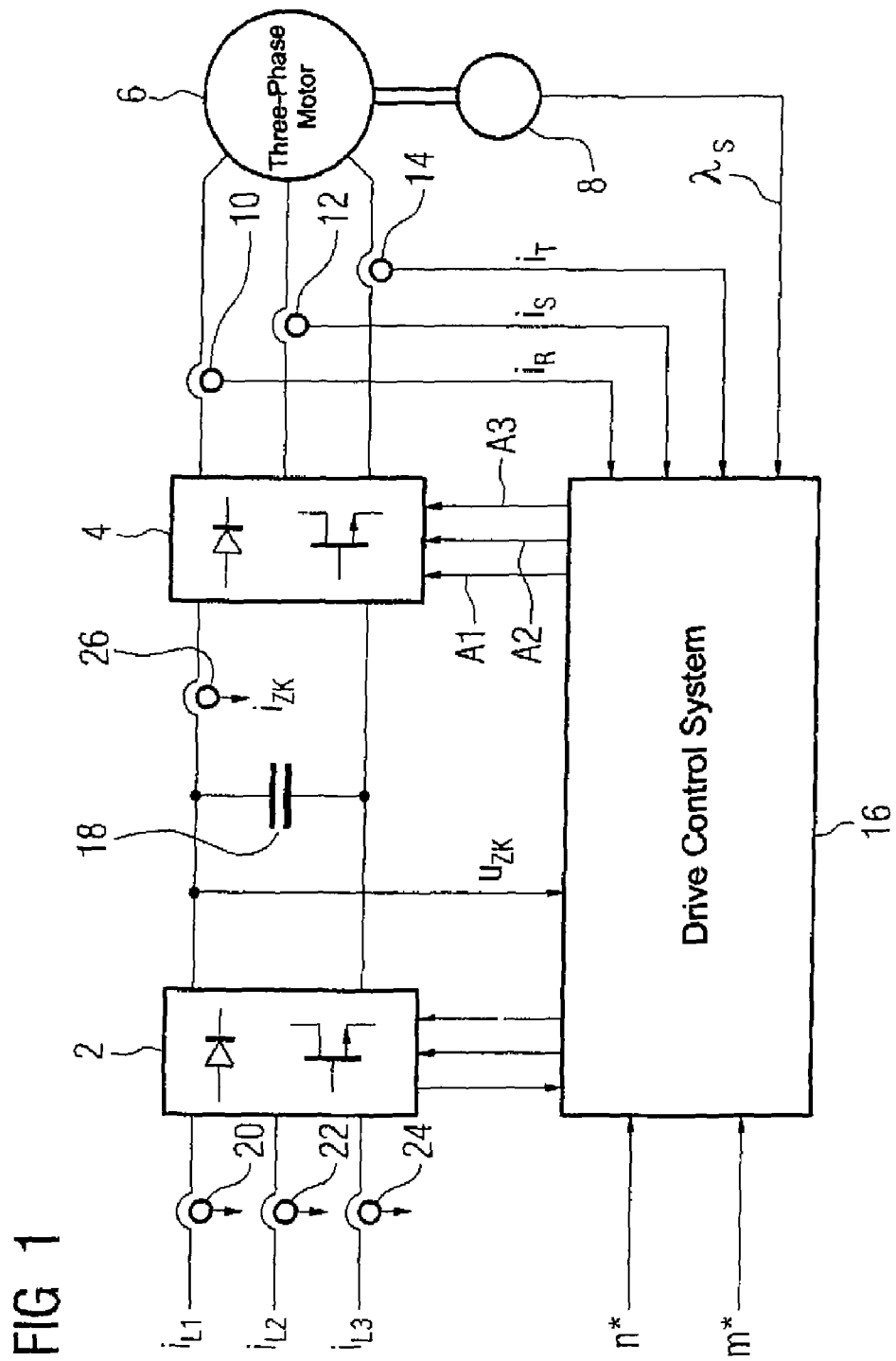
FIG. 1 shows a functional diagram of a variable-speed three-phase drive.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a functional diagram of a variable-speed three-phase drive. Reference numeral 2 denotes a converter on the power supply system side, 4 denotes an inverter on the load side, 6 denotes a three-phase motor, 8 denotes a position detection device, 10, 12, 14 each denote a current detection device, 16 denotes a drive control system and 18 denotes an DC-link capacitor. This functional diagram likewise illustrates current detection devices 20, 22 and 24 which are used to detect power supply system phase currents $i_{L2}, i_{L2}, i_{L3}$ of a feeding power supply system, and a current detection device 26 which is used to detect an DC-link current $i_{ZK}$. The converter 2 on the power supply system side may be a diode rectifier or a converter with a feedback capability, for example, a self-commutated pulse-controlled converter. If a self-commutated pulse-controlled converter, which is also referred to as an Active-Front-End (AFE), is used on the power supply system side, then the current detection devices 20, 22 and 24 on the power supply system side are required. These are not required if a diode rectifier is used on the power supply system side. A self-commutated pulse-controlled converter is used as the load-side converter 4, also referred to as inverter 4, since the load-side inverter predominately carries power to the three-phase motor 6. The converter 2 and the inverter 4 are electrically conductively connected on the DC voltage side by the DC-link capacitor 18. Dynamic drive requires a position detection device 8, wherein an actual rotation speed value n is produced from the position angle $\lambda_s$ by differentiation. To allow the load-side inverter 4 and, in some circumstances, also the converter 2 on the power supply system side to be driven, the drive control system 16 is supplied with the motor phase currents $i_R$, $i_S$, and $i_T$, which are also referred to as frequency-converter output currents, the position angle $\lambda_s$, an DC-link voltage $U_{ZK}$ and an DC-link current $i_{ZK}$. This drive control system 16 uses these measured values and predetermined nominal values n* for the rotation speed and/or m* for the torque to calculate at least drive signals A1, A2 and A3 for the load-side inverter 4 as a function of motor parameters. The units 2, 4, 10, 12, 14, 16 and 18 form a frequency converter, in particular a voltage DC-link frequency converter.

Figure 2:
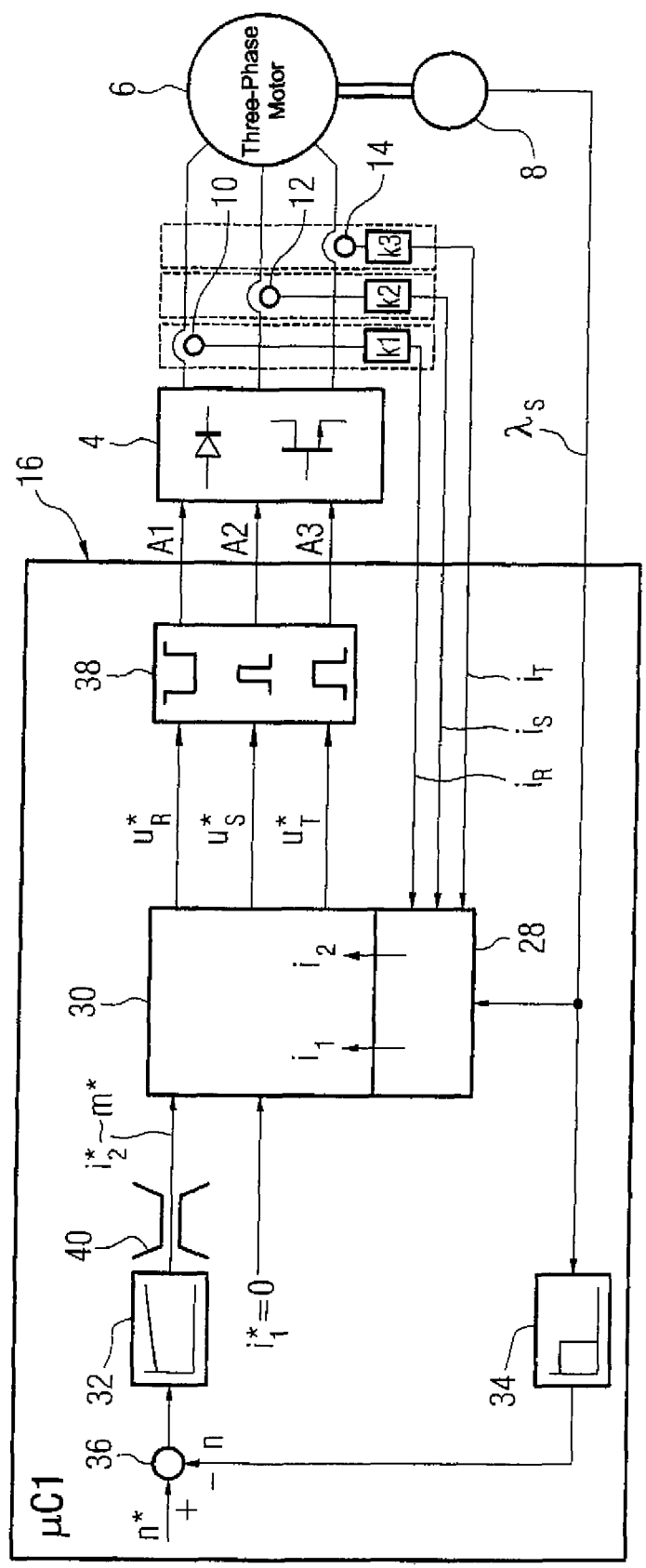
FIG. 2 shows an equivalent circuit of a drive control system for a variable-speed three-phase drive as shown in FIG. 1.

FIG. 2 shows in form of a schematic diagram an exemplary embodiment of the drive control system 16 for the three-phase drive shown in FIG. 1. This drive control system 16 is a field-oriented control system. This field-oriented control system has a coordinate transformation device 28, a lower-level current control device 30 and a speed regulator 32. This drive control system 16 also has a differentiator 34, a comparator 36 and a modulator 38. The outputs of the current detection devices 10, 12 and 14 are each linked by means of a normalization factor K1, K2 and K3 to the coordinate transformation device 28.

This coordinate transformation device 28 is likewise linked to an output of the position detection device 8 with this output likewise being connected to an input of the differentiator 34. The output side of this differentiator 34 is linked to a negative input of the comparator 36. A predetermined nominal rotation speed value n* is applied to the positive input of this comparator 36. The output side of this comparator 36 is connected to the speed regulator 32 whose output is connected by means of a limiter 40 to an input of the lower-level current control device 30.

The output variable from the speed regulator 32 is a field-oriented current component $i_2$ which is proportional to the torque m of the three-phase motor 6. For this reason, this current component $i_2$ is also referred to as the torque-forming current component $i_2$. A second field-oriented current component $i_1$ is proportional to the flux in the three-phase motor 6. For this reason, this current component is referred to as the flux-forming current component $i_1$. These two current components $i_1$ and $i_2$ are orthogonal to one another. Since these two orthogonal field-oriented current components $i_1$ and $i_2$ of a field-oriented stator-current space vector are supplied to the lower-level current control device 30, these are the nominal values $i_1$* and $i_2$*. This lower-level current control device 30 receives two actual current component values $i_1$ and $i_2$ from the coordinate transformation device 28. Since the aim is to control two current components $i_1$ and $i_2$, this lower-level current control device 30 has two current regulators.

A field-oriented stator-voltage component is produced at the outputs of each current regulator from which stator-oriented phase voltages $u_R$*, $u_S$* and $u_T$* are generated, as an actuating voltage, by means of a second coordinate transformation device and the position angle $\lambda_s$. Drive signals A1, A2 and A3 for the load-side inverter 4 are generated from these phase voltages $u_R$*, $u_S$* and $u_T$* by means of the modulator 38.

An actual rotation speed value n for the speed regulator 32 is determined by differentiating the determined position angle $\lambda_s$ with respect to time. This differentiation with respect to time is carried out in the differentiator 34.

In this embodiment, the value zero from the lower-level current control device 30 is supplied to the drive control system 16 as the flux-forming nominal current component value $i_1$*. This can be used to deduce the fact that the three-phase motor 6 is a synchronous motor with permanent-magnet excitation. In the case of an asynchronous motor, this nominal current component value $i_1$* is predetermined on the basis of a predetermined flux value.

Commercially available drive control systems 16 for a frequency converter may be implemented as a microprocessor system μC1.

Figure 3:
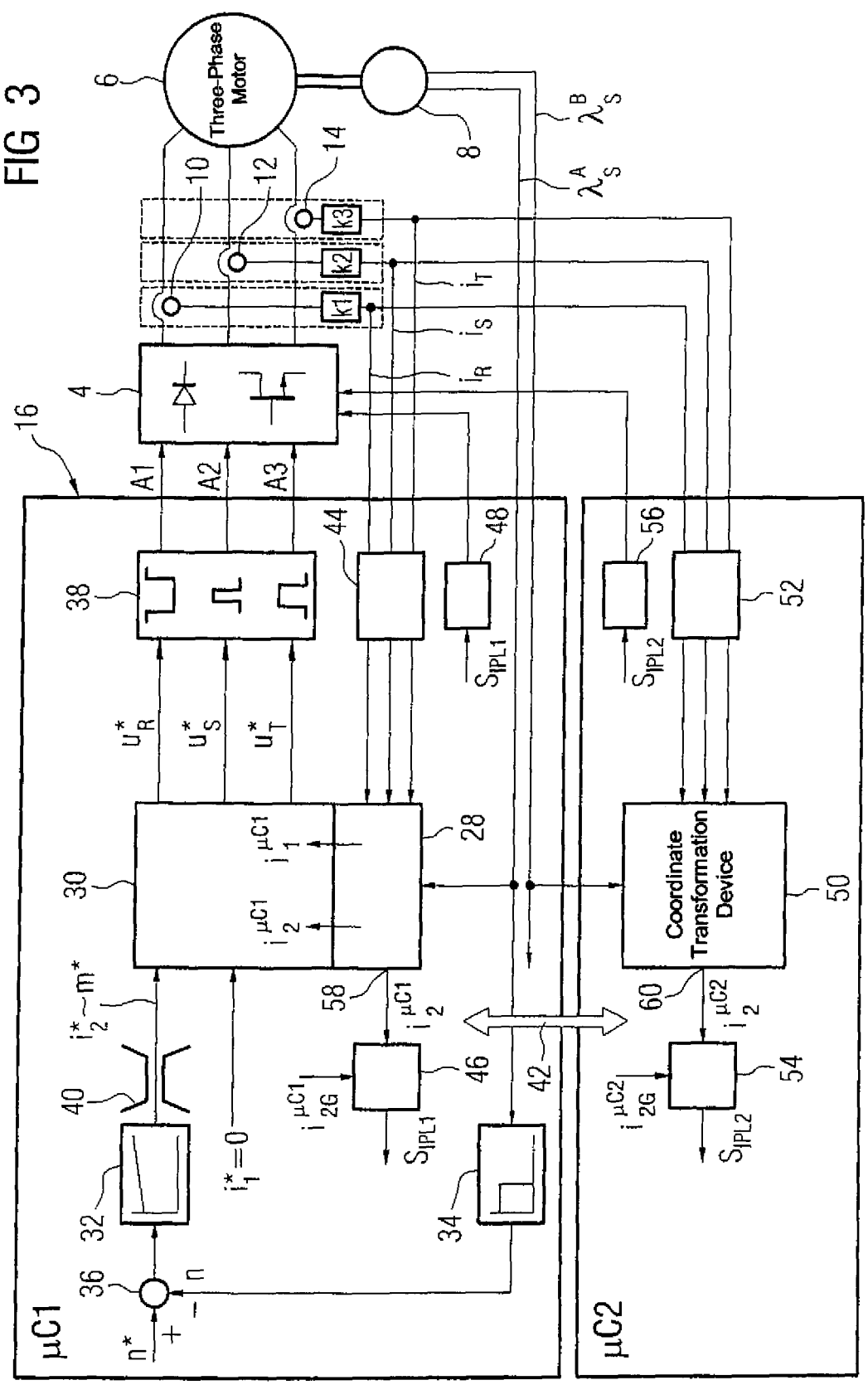
FIG. 3 shows an equivalent circuit of a first apparatus for carrying out the method according to the invention for safe torque limiting.

FIG. 3 shows schematically a first embodiment of an apparatus for carrying out the method according to the invention for torque limiting. This apparatus has a second microprocessor system μC2 in addition to the drive control system 16 (microprocessor system μC1). This microprocessor system μC2 is advantageously already present in the frequency converter. A second microprocessor system μC2 is preferably provided for man-machine communication. These two microprocessor systems μC1 and μC2 are connected to one another for data purposes by means of a communications device 42. Crosswise data comparison is carried out by means of this communication device 42, in particular a bus system.

This microprocessor system μC1 differs from the microprocessor system μC1 in FIG. 2 in that a sensor signal processing device 44, limit monitor 46 and a pulse cancellation device 48 are additionally provided. In addition to a coordinate transformation device 50, the microprocessor system μC2 likewise has a sensor signal processing device 52, limit monitoring 54 and a pulse cancellation device 56. The current detection devices 10, 12 and 14 are each electrically conductively connected by means of their normalization factors K1, K2 and K3 to inputs of the sensor signal processing device 44 of the first microprocessor system μC1 and to inputs of the sensor signal processing device 52 of the second microprocessor system μC2. These two sensor signal processing devices 44 and 52 likewise have normalization factors $V1_1$, $V2_1$, $V3_1$ and $V1_2$, $V2_2$, $V3_2$. On the output side each sensor signal processing device 44 and 52 is linked to a corresponding coordinate transformation device 28 and 50. These coordinate transformation devices 28 and 50 are connected by a respective output 58 and 60 to a corresponding limit monitor 46 and 54. A torque-forming current component $i_2^{\mu C1}$ and $i_2^{\mu C2}$ is respectively produced at these outputs 58 and 60 and these are compared by means of the limit monitors 46 and 54 with a predetermined limit value $i_{2G}^{\mu C1}$ and $i_{2G}^{\mu C2}$ for these torque-forming current components $i_2^{\mu C1}$ and $i_2^{\mu C2}$. The output sides of these two limit monitors 46 and 54 are connected to respective corresponding pulse cancellation devices 48 and 56. As soon as a calculated torque-forming current component $i_2^{\mu C1}$ or $i_2^{\mu C2}$ exceeds a predetermined limit value $i_{2G}^{\mu C1}$ or $i_{2G}^{\mu C2}$ respectively, a respective pulse cancellation signal $S_{IPL1}$ or $S_{IPL2}$ is generated. This pulse cancellation signal $S_{IPL1}$ or $S_{IPL2}$ respectively is used to directly drive the respective pulse cancellation device 48 or 56, which is driven indirectly by means of the communication device 42. In consequence, the two channels of the load-side inverter 4 are inhibited. This means that the load-side inverter 4 is inhibited by means of the "safe stop" safety function.

In order to allow the torque-forming current component $i_2$ to be safely calculated, this component is in each case calculated by means of one microprocessor system μC1 and μC2, independently of one another. For this purpose each microprocessor system μC1 and μC2 is supplied with the measured phase currents $i_R$, $i_S$, and $i_T$ of the three-phase motor (6), and these are processed independently of one another. Each microprocessor system μC1 and μC2 uses these processed phase currents to calculate a torque-forming current component $i_2^{\mu C1}$ and $i_2^{\mu C2}$ as a function of a safely determined position angle $\lambda_S^A$ and $\lambda_S^B$. These safe position angles $\lambda_S^A$ and $\lambda_S^B$ are generated from two sensor signals sin α and cos α depending on a two-channel evaluation device.

For a continuous real two-channel capability it would be necessary to provide six current detection devices instead of three current detection devices 10, 12 and 14. This is neither practicable nor economically acceptable.

A plausibility check is carried out in each microprocessor system μC1 and μC2 in order to ensure that the phase currents $i_R$, $i_S$, and $i_T$ can be regarded as detected on two channels. A current sum is respectively calculated from the measured phase currents $i_R$, $i_S$ and $i_T$ for this purpose in each microprocessor system μC1 and μC2. Each microprocessor system μC1 and μC2 itself checks whether the value of the sum current is equal to zero. This condition must always be satisfied for correct operation (no neutral connection of the motor winding; no ground fault).

If this condition is satisfied, then the phase currents $i_R$, $i_S$, and $i_T$ are determined on two channels. If this condition is not satisfied, the load-side inverter 4 is switched to zero torque by means of the "safe stop" safety function. The load-side inverter 4 is likewise switched to zero torque by means of the "safe stop" safety function when the crosswise data comparison shows that the torque-forming current components $i_2^{\mu C1}$ and $i_2^{\mu C2}$ produced independently of one another in the two microprocessor systems μC1 and μC2 are not equal. Faults in the elements 8, 44, 52, 28 and 50 are detected by means of the crosswise data comparison.

Figure 4:
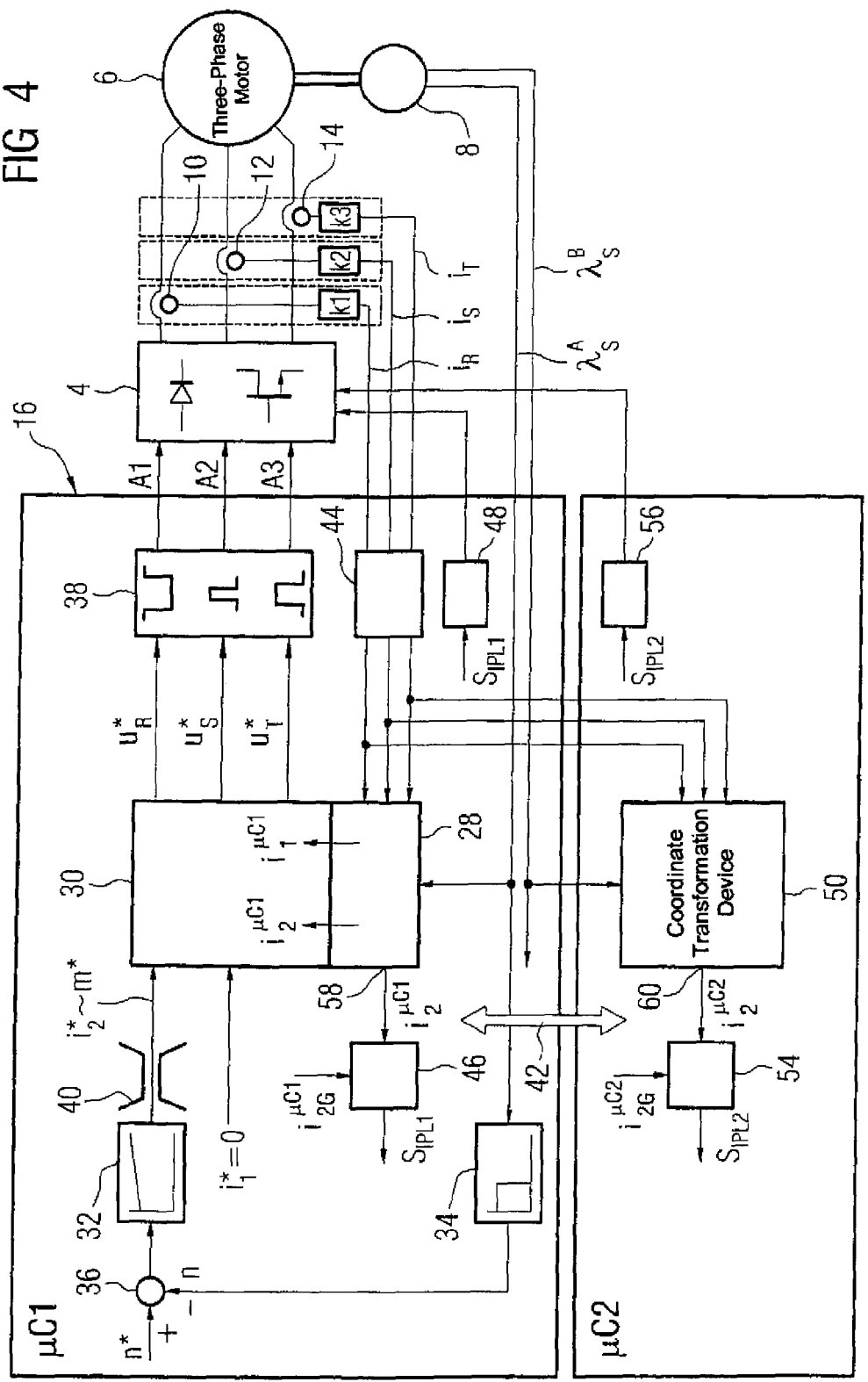
FIG. 4 shows an equivalent circuit of a second apparatus.
Figure 5:
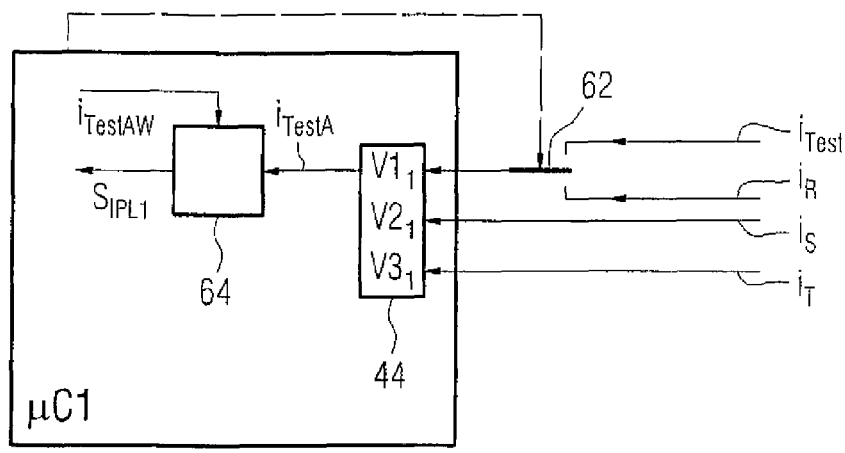
FIG. 5 shows a functional diagram of a first embodiment of a device for detecting a simultaneity normalization error.
Figure 6:
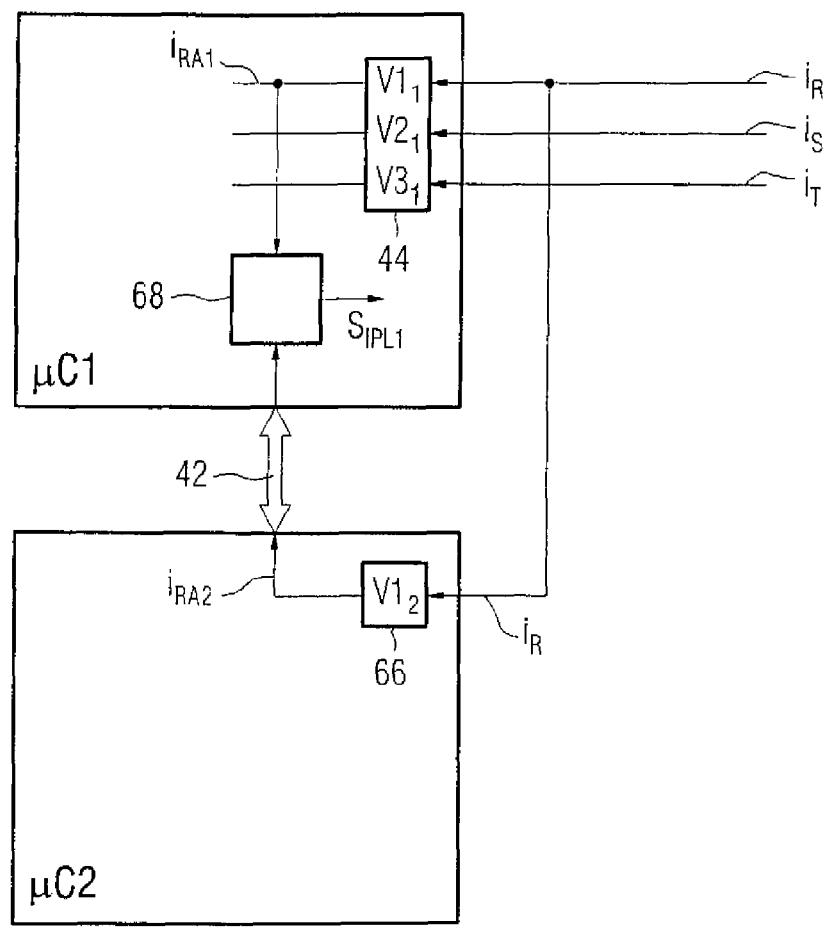
FIG. 6 shows a functional diagram of a second embodiment of a device for detecting a simultaneity normalization error.

FIG. 4 shows, schematically, a second embodiment of an apparatus for carrying out a method according to the invention for torque limiting. This embodiment differs from the embodiment shown in FIG. 3 in that the microprocessor system μC2 no longer has a sensor signal processing device 52. For this purpose, the microprocessor system μC1 has a device for detecting a simultaneity normalization error. Since this device may be designed differently, this device has been dispensed with in this illustration. FIGS. 5 and 6 each show, schematically, one embodiment of a device such as this. The second embodiment costs less because a sensor signal processing device 52 is saved. However, drive systems also exist in which only one sensor signal processing device is available. Drive systems such as these can also be equipped with a method according to the invention for torque limiting.

The normalization factors K1, K2 and K3 (the numerical value indicates the amount of current for the system) change by the same value at the same time. This error is referred to as a simultaneity normalization error. The probability of a simultaneity normalization error such as this is assumed to be low.

If a simultaneity normalization error has nevertheless been detected from the normalization factors K1, K2 and K3 from the current detection devices 10, 12 and 14 and/or the normalization factors $V1_1$, $V2_1$ and $V3_1$ from the sensor signal processing device 44, whose probability is considerably higher than a simultaneity normalization error in the normalization factors K1, K2 and K3 from the current detection devices 10, 12 and 14, then the following steps can be carried out before starting torque-monitored operation:

If the motor data, preferably the stator resistance of the motor, is known, a specific voltage can be predetermined in the open current and speed control loop. An appropriate current must be set in this way if the stator resistance is known. In order to avoid the possibility of a torque being produced during this process, thus allowing a motor shaft to move, the voltage or the angle of the voltage vector is predetermined such that only a field-forming current component can build up. If this does not occur a simultaneity normalization error has occurred in the normalization factors K1, K2 and K3 from the current detection devices 10, 12 and 14 and/or the normalization factors $V1_1$, $V2_1$ and $V3_1$ from the sensor signal processing device 44. This error can be verified with the aid of the power supply system phase currents $i_{L1}$, $i_{L2}$ and $i_{L3}$ or the DC-link current $i_{ZK}$. Simultaneity normalization errors which occur during torque-monitored operation are, however, not identified in this way.

FIG. 5 shows a first embodiment of a device for detecting simultaneity normalization errors during torque-monitored operation, caused by the normalization factors $V1_1$, $V2_1$ and $V3_1$ from the sensor signal processing device 44, schematically. In this embodiment, this device has a changeover switch 62 and a device 64 for expectation checking. By way of example, the current detection device 10 is connected to a first input of this changeover switch 62 at which the phase current $i_R$ is present, and a device for generating a test signal $i_{Test}$ is connected to the second input of this changeover switch 62. The device 64 for expectation checking is linked on the input side to the output of the sensor signal processing device 44 at which a processed test signal $i_{TestA}$ is produced.

All three phase currents $i_R$, $i_S$, and $i_T$ or only two of the phase currents $i_R$, $i_S$, or $i_S$, $i_T$ or $i_T$, $i_R$ respectively are in each case used alternately while controlling the current of the field-oriented control of the drive control system 16. The microprocessor system μC1 knows when which phase currents are used. When only two phase currents $i_S$ and $i_T$ are actually being used, then the corresponding part of the sensor signal processing device 44 in the unused phase, that is to say in this case the phase R, may have a test signal $i_{Test}$ applied to it in order to check the normalization factor $V1_1$. This means that the changeover switch 62 is operated, resulting in a generated test signal $i_{Test}$ now being applied to the input of the phase R of the sensor signal processing device 44. Since the microprocessor system μC1 knows the amplitude value of the test signal $i_{Test}$ it also knows the true value of the processed test signal $i_{TestAW}$ (expectation). This expectation can be checked by means of the device 64. All that is necessary to do this is to compare the processed test signal $i_{TestA}$ with the expectation $i_{TestAW}$. If they are not equal, a normalization error has occurred in the normalization factor $V1_1$ and a pulse cancellation signal $S_{IPL1}$ is generated in order to allow the three-phase motor 6 to be switched to zero torque on two channels. Since, according to the definition of the simultaneity normalization error, the normalization factors $V1_1$, $V2_1$ and $V3_1$ change at the same time by the same value in the sensor signal processing device 44, this simultaneity normalization error can be determined from the check of a normalization factor $V1_1$, $V2_1$ or $V3_1$.

FIG. 6 shows, schematically, a second embodiment of a device for detecting a simultaneity normalization error during torque-monitoring operation, caused by the normalization factors $V1_1$, $V2_1$ and $V3_1$ from the sensor signal processing device 44. In this embodiment, a second sensor signal processing device 66 is again required, but this processes only one phase current. This sensor signal processing device 66 therefore has a considerably simpler design than the sensor signal processing device 52 in the microprocessor system μC2 and can be integrated retrospectively without major effort, in a commercially available frequency converter as well. This "slimmed-down" sensor signal processing device 66 has only one normalization factor $V1_2$. According to this embodiment of the device for detecting a simultaneity normalization error, the outputs of the current detection device 10, 12 and 14 at which the phase currents $i_R$, $i_S$, and $i_T$ are produced are supplied to the normalization factors $V1_1$, $V2_1$ and $V3_1$ of the sensor signal processing device 44 in the first microprocessor system μC1 in the drive control system 16. A current detection device 10, 12 or 14 is also linked with the normalization factor $V1_2$ of the "slimmed-down" sensor signal processing device 66 in the second microprocessor system μC2. In the illustrated embodiment, this is the phase R. These two processed phase currents $i_{RA1}$ and $i_{RA2}$ are checked for equality by means of a device 68. If they are not equal, this device 68 generates a pulse cancellation signal $i_{IPL1}$ which is used to switch the three-phase motor 6 to zero torque, on two channels.

This method according to the invention for safe torque limiting results in the known safety functions having a further safety function added to them, specifically the "safe torque limiting" function, which can be integrated in commercially available frequency converters, irrespective of whether the drive control system for the frequency converter has one or two sensor signal processing devices.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for safely limiting a torque of a frequency-converter-fed three-phase motor operated under field-oriented control, comprising the steps of:
   a) measuring phase currents of the three-phase motor,
   b) forming sum current signals from the measured phase currents and checking on two channels that each of the sum current signals has a sum value of zero,
   c) determining on two channels a rotor position angle of the three-phase motor,
   d) computing on the two channels from the measured phase currents corresponding torque-forming current components as a function of the rotor position angle,
   e) monitoring the computed torque-forming current components and determining if the computed torque-forming current components exceed a predetermined current component limit value,
   f) crosswise comparing the computed torque-forming current components for equality, and
   g) generating a pulse cancellation signal when the computed torque-forming current components exceed a limit value or are not equal.

2. The method of claim 1, wherein the rotor position angle is determined by forming a rotor position angle signal from transmitter signals received on each of the two channels.

3. A method for safely limiting a torque of a frequency-converter-fed three-phase motor operated under field-oriented control, comprising the steps of:
   a) measuring phase currents of the three-phase motor,
   b) forming a sum current signal from the measured phase currents and checking on one channel that the sum current signal has a value of zero,
   c) determining a simultaneity normalization error,
   d) determining on two channels a rotor position angle of the three-phase motor,
   e) computing on the two channels from the measured phase currents corresponding torque-forming current components as a function of the rotor position angle,
   f) monitoring the computed torque-forming current components and determining if the computed torque-forming current components exceed a predetermined current component limit value,
   g) crosswise comparing the computed torque-forming current components for equality, and
   h) generating a pulse cancellation signal when the computed torque-forming current components exceed a limit value or are not equal, or a simultaneity normalization error is detected in the measured phase currents.

4. The method of claim 3, further comprising the steps of determining the simultaneity normalization error by applying a test signal, processing the test signal and comparing the processed test signal with a true value, and generating the pulse cancellation signal if the processed test signal is not equal to the true value.

5. The method of claim 3, further comprising the steps of processing a measured phase current on two channels to determine the simultaneity normalization error, comparing signals obtained in the two channels with one another, and generating the pulse cancellation signal if the signals in the two channels are not equal.

6. The method of claim 3, wherein a rotor position angle is determined by forming a rotor position angle signal from transmitter signals received on each of the two channels.

7. An apparatus for safely limiting a torque of a frequency-converter-fed three-phase motor operated under a field-oriented control, comprising:
   a drive control device for a load-side inverter of the frequency converter, said drive control having a first microprocessor system,
   a second microprocessor system,
   wherein each of the microprocessor systems comprises a coordinate transformation device, a sensor signal processing device, a limit monitor, and a pulse cancellation device,
   wherein in each of the microprocessor systems, an output of the sensor signal processing device and an input of the limit value monitor are connected to the corresponding coordinate transformation device, and wherein an output of the limit monitor is connected to the corresponding pulse cancellation device, a current detection device for each of the three motor phases, with each current detection device connected to a corresponding sensor signal processing device of the first and second microprocessor systems, a position detector device having a two-channel processing device with two outputs, wherein the outputs are connected to corresponding one of the coordinate transformation devices, and a communication device connecting the two microprocessor systems for data transmission therebetween.

8. The apparatus of claim 6, wherein each coordinate transformation device has a coordinate converter and a vector rotator, which are electrically connected in series.

9. The apparatus of claim 6, wherein each current detection device is provided with a normalization factor.

10. The apparatus of claim 6, wherein each limit monitor includes a comparator, with a predetermined limit value being applied to a non-inverting input of the comparator.

11. The apparatus of claim 6, wherein the load-side inverter is a self-commutating pulse-controlled inverter.

12. The apparatus of claim 7, wherein the communication device includes a bus system.

13. The apparatus of claim 7, wherein the first and second microprocessor systems are part of a frequency converter.

14. An apparatus for safely limiting a torque of a frequency-converter-fed three-phase motor operated under a field-oriented control, comprising:

a drive control device for a load-side inverter of the frequency converter, said drive control having a first microprocessor system, a second microprocessor system, wherein each of the microprocessor systems comprises a coordinate transformation device, a sensor signal processing device, a limit monitor, and a pulse cancellation device, wherein in each of the microprocessor systems, an input of the limit monitor is connected to the coordinate transformation device and an output of the limit monitor is connected to the pulse cancellation device, a current detection device for each of the three motor phases, with the current detection devices connected to a sensor signal processing device disposed in the first microprocessor system, wherein an output of the sensor signal processing device is connected to the coordinate transformation device of the first microprocessor system, a position detector device having a two-channel processing device with two outputs, wherein the outputs are connected to corresponding one of the coordinate transformation devices of the first and second microprocessor systems, a communication device connecting the two microprocessor systems for data transmission therebetween, and a device for detecting a simultaneity normalization error.

15. The apparatus of claim 14, wherein each coordinate transformation device has a coordinate converter and a vector rotator, which are electrically connected in series.

16. The apparatus of claim 14, wherein each current detection device is provided with a normalization factor.

17. The apparatus of claim 14, wherein each limit monitor includes a comparator, with a predetermined limit value being applied to a non-inverting input of the comparator.

18. The apparatus of claim 14, wherein the load-side inverter is a self-commutating pulse-controlled inverter.

19. The apparatus of claim 14, wherein communication device includes a bus system.

20. The apparatus of claim 14, wherein the first and second microprocessor systems are part of a frequency converter.

* * * * *

UNITED STATES PATENT AND TRADEMARK OFFICE
CERTIFICATE OF CORRECTION

PATENT NO. : 7,737,652 B2  Page 1 of 1
APPLICATION NO. : 11/851768
DATED : June 15, 2010
INVENTOR(S) : Schwesig It is certified that error appears in the above-identified patent and that said Letters Patent is hereby corrected as shown below:

On the Title page, column 2, under "FOREIGN PATENT DOCUMENTS"

Line 1, replace "DE 198 07 688 A1" with --DE 196 07 688 A1--;

On the Title page, column 2, under "OTHER PUBLICATIONS"

Line 1, replace "Saftey" with the correct --Safety--.

Signed and Sealed this

Ninth Day of November, 2010

David J. Kappos
*Director of the United States Patent and Trademark Office*